US010599519B2

(12) United States Patent
Dhuse et al.

(10) Patent No.: US 10,599,519 B2
(45) Date of Patent: Mar. 24, 2020

(54) COORDINATING NODE MODIFICATION OF AN INDEX STRUCTURE VIA DELEGATES

(71) Applicant: International Business Machines Corporation, Armonk, NY (US)

(72) Inventors: Greg R. Dhuse, Chicago, IL (US);
Adam M. Gray, Chicago, IL (US);
Scott M. Horan, Clarendon Hills, IL (US); Ravi V. Khadiwala, Bartlett, IL (US); Tyler K. Reid, Schaumburg, IL (US); Daniel J. Scholl, Chicago, IL (US); Ilya Volvovski, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 229 days.

(21) Appl. No.: 15/334,433

(22) Filed: Oct. 26, 2016

(65) Prior Publication Data

US 2017/0123911 A1 May 4, 2017

Related U.S. Application Data

(60) Provisional application No. 62/248,636, filed on Oct. 30, 2015.

(51) Int. Cl.
*H04L 29/08* (2006.01)
*G06F 11/10* (2006.01)
(Continued)

(52) U.S. Cl.
CPC .......... *G06F 11/1076* (2013.01); *G06F 3/061* (2013.01); *G06F 3/064* (2013.01);
(Continued)

(58) Field of Classification Search
CPC ............. G06F 11/1076; G06F 11/1008; G06F 11/106; G06F 3/0659; G06F 3/0635;
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Albert Decady
*Assistant Examiner* — Enam Ahmed
(74) *Attorney, Agent, or Firm* — Garlick & Markison; Timothy Markison; Bruce E. Stuckman

(57) ABSTRACT

A method includes determining, by a computing device, to change a node of a hierarchical index structure. The method further includes determining, by the computing device, whether one or more other computing devices are attempting to change the node. The method further includes, when yes, determining, by the computing device and/or the other computing device(s), to use a delegate device to process multiple change requests to the node. The method further includes, when determined to use the delegate device, sending, by the computing device, a message to the delegate device requesting the delegate device to process the change to the node. The method further includes coordinating, by the delegate device, requested changes to the node by the computing device and the other computing device(s). The method further includes updating, by the delegate device, the node in accordance with the coordinating of the requested changes.

16 Claims, 9 Drawing Sheets

(51) Int. Cl.

| | | |
|---|---|---|
| *H03M 13/15* | (2006.01) | |
| *G06F 3/06* | (2006.01) | |
| *H04L 29/06* | (2006.01) | |
| *H04L 9/08* | (2006.01) | |
| *H03M 13/37* | (2006.01) | |
| *G06F 11/20* | (2006.01) | |
| *G06F 9/48* | (2006.01) | |
| *H04L 9/14* | (2006.01) | |
| *G06F 12/06* | (2006.01) | |
| *H04L 12/24* | (2006.01) | |
| *H04L 12/927* | (2013.01) | |

(52) U.S. Cl.
CPC ............ *G06F 3/067* (2013.01); *G06F 3/0619* (2013.01); *G06F 3/0622* (2013.01); *G06F 3/0623* (2013.01); *G06F 3/0635* (2013.01); *G06F 3/0659* (2013.01); *G06F 9/4856* (2013.01); *G06F 11/1092* (2013.01); *G06F 11/1096* (2013.01); *G06F 11/2094* (2013.01); *G06F 12/0646* (2013.01); *H03M 13/1515* (2013.01); *H03M 13/3761* (2013.01); *H04L 9/0861* (2013.01); *H04L 9/14* (2013.01); *H04L 41/0816* (2013.01); *H04L 47/803* (2013.01); *H04L 63/0428* (2013.01); *H04L 63/0457* (2013.01); *H04L 63/06* (2013.01); *H04L 63/068* (2013.01); *H04L 63/08* (2013.01); *H04L 63/101* (2013.01); *H04L 67/1097* (2013.01); *G06F 2201/805* (2013.01); *G06F 2201/82* (2013.01); *G06F 2212/1008* (2013.01); *G06F 2212/657* (2013.01)

(58) Field of Classification Search
CPC .. G06F 3/061; G06F 12/0646; G06F 11/1096; G06F 11/1092; G06F 3/0622; G06F 9/4856; G06F 11/2094; G06F 3/067; G06F 3/064; G06F 3/0623; G06F 3/0619; G06F 2212/657; G06F 2212/1008; G06F 2201/82; G06F 2201/805; H05K 999/99; G11C 2029/0411; H04L 47/803; H04L 41/0816; H04L 67/1097; H04L 63/101; H04L 63/08; H04L 63/06; H04L 9/14; H04L 63/068; H04L 9/0861; H04L 63/0457; H04L 63/0428; H03M 13/3761; H03M 13/1515
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 7,647,329 B1* | 1/2010 | Fischman | G06F 17/30094 707/999.1 |
| 9,171,031 B2* | 10/2015 | Dhuse | G06F 3/067 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0036615 A1* | 2/2005 | Jakobsson | H04L 9/3234 380/255 |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0168135 A1* | 7/2008 | Redlich | G06Q 10/10 709/204 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2013/0086269 A1* | 4/2013 | Bairavasundaram | G06F 9/5011 709/226 |
| 2014/0330829 A1* | 11/2014 | Bentkofsky | G06F 17/30327 707/737 |
| 2016/0182088 A1* | 6/2016 | Sipos | G06F 3/064 714/764 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

(56) References Cited

OTHER PUBLICATIONS

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

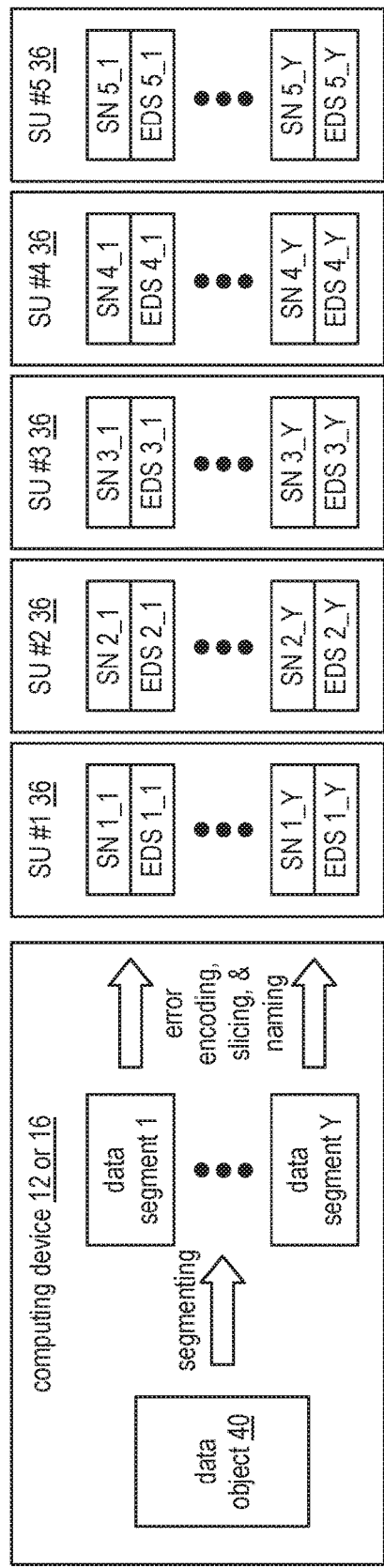
FIG. 3
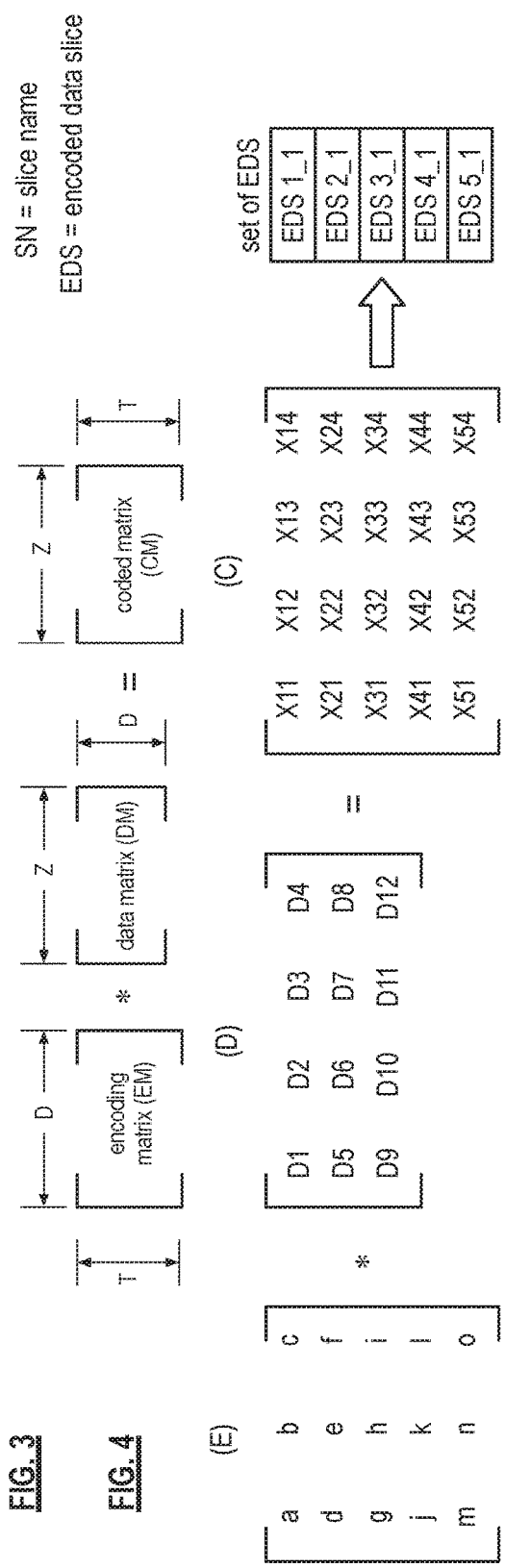
FIG. 4
FIG. 5
FIG. 6

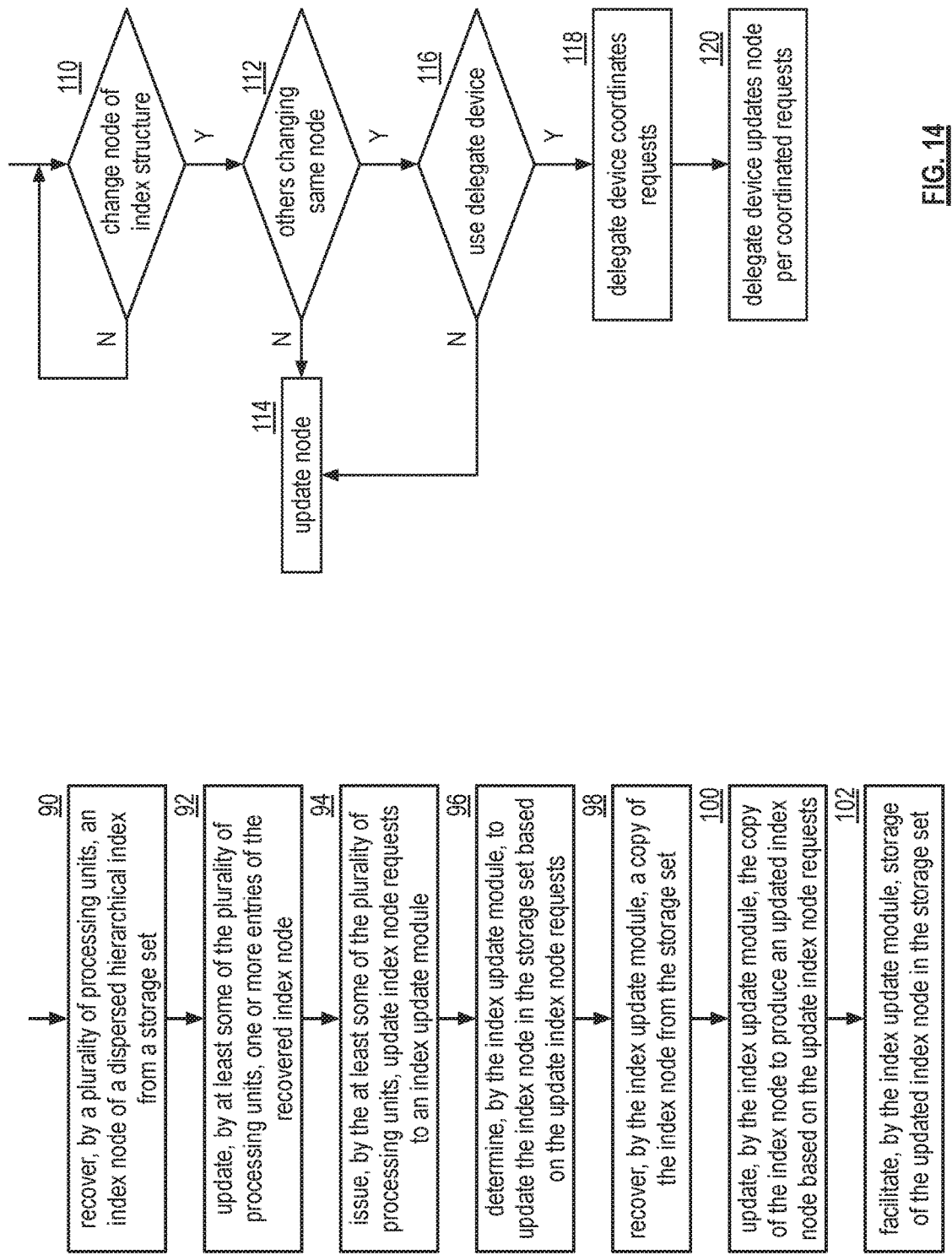

COORDINATING NODE MODIFICATION OF AN INDEX STRUCTURE VIA DELEGATES

CROSS-REFERENCE TO RELATED APPLICATIONS

The present U.S. Utility Patent Application claims priority pursuant to 35 U.S.C. § 119(e) to U.S. Provisional Application No. 62/248,636, entitled "SECURELY STORING DATA IN A DISPERSED STORAGE NETWORK", filed Oct. 30, 2015, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

In cloud storage systems, it is common to use one or more index structures to improve the ease of finding data. For example, one index structure is used for find data based on alphabetic indexing. As another example, another index structure is used to find data based on key words contained in the title of the data. As yet another example, another index structure is used to find data based on the type of data (e.g., video, audio, text, pictures, etc.). As the data changes within the cloud storage system, one or more index structures may need to be updated.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 13 is a logic diagram of an example of a method of updating a hierarchical index structure of a DSN in accordance with the present invention; and FIG. 14 is a logic diagram of another example of a method of updating a hierarchical index structure of a DSN in accordance with the present invention.

DETAILED DESCRIPTION OF THE INVENTION

Figure 1:
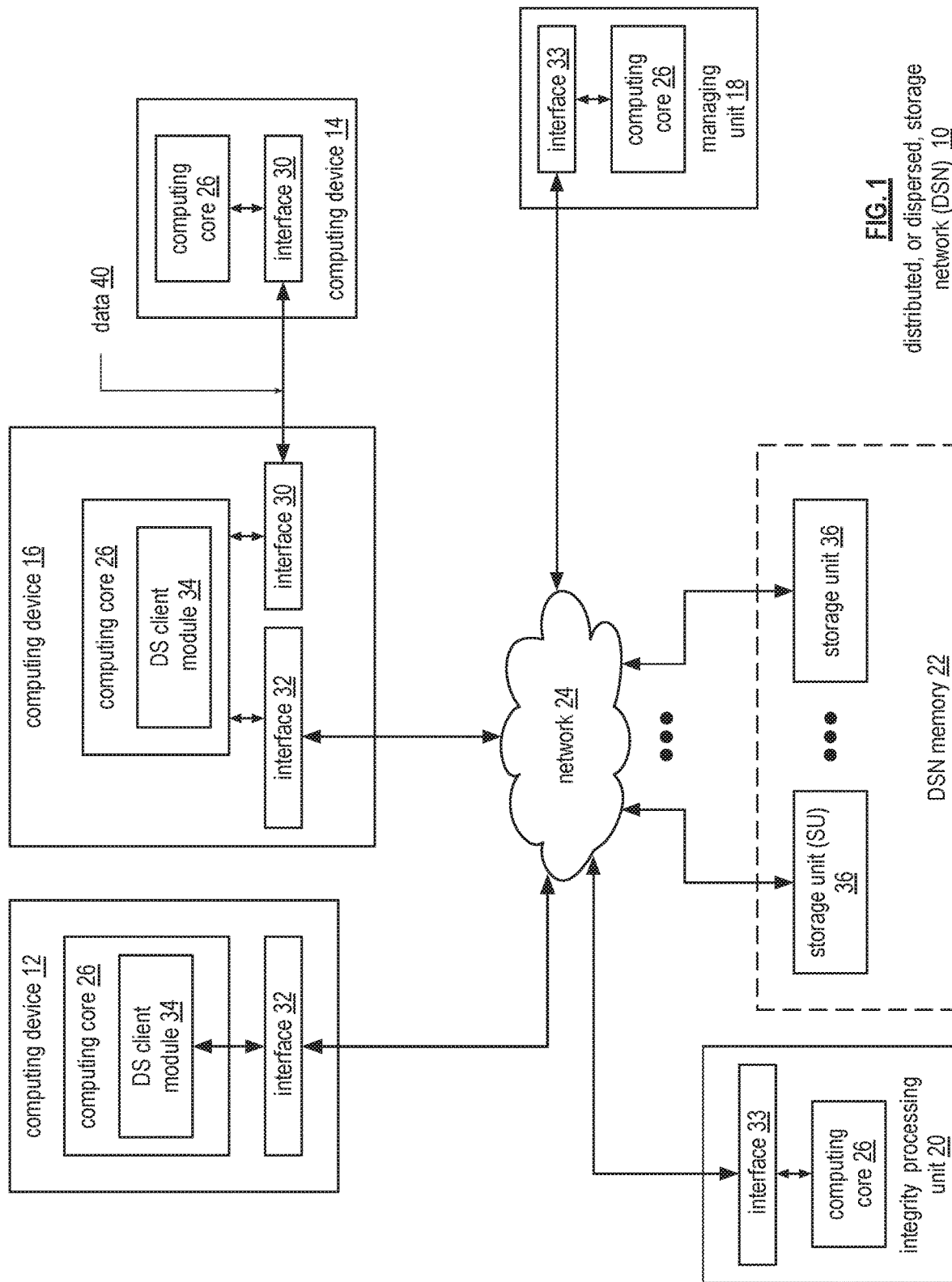
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
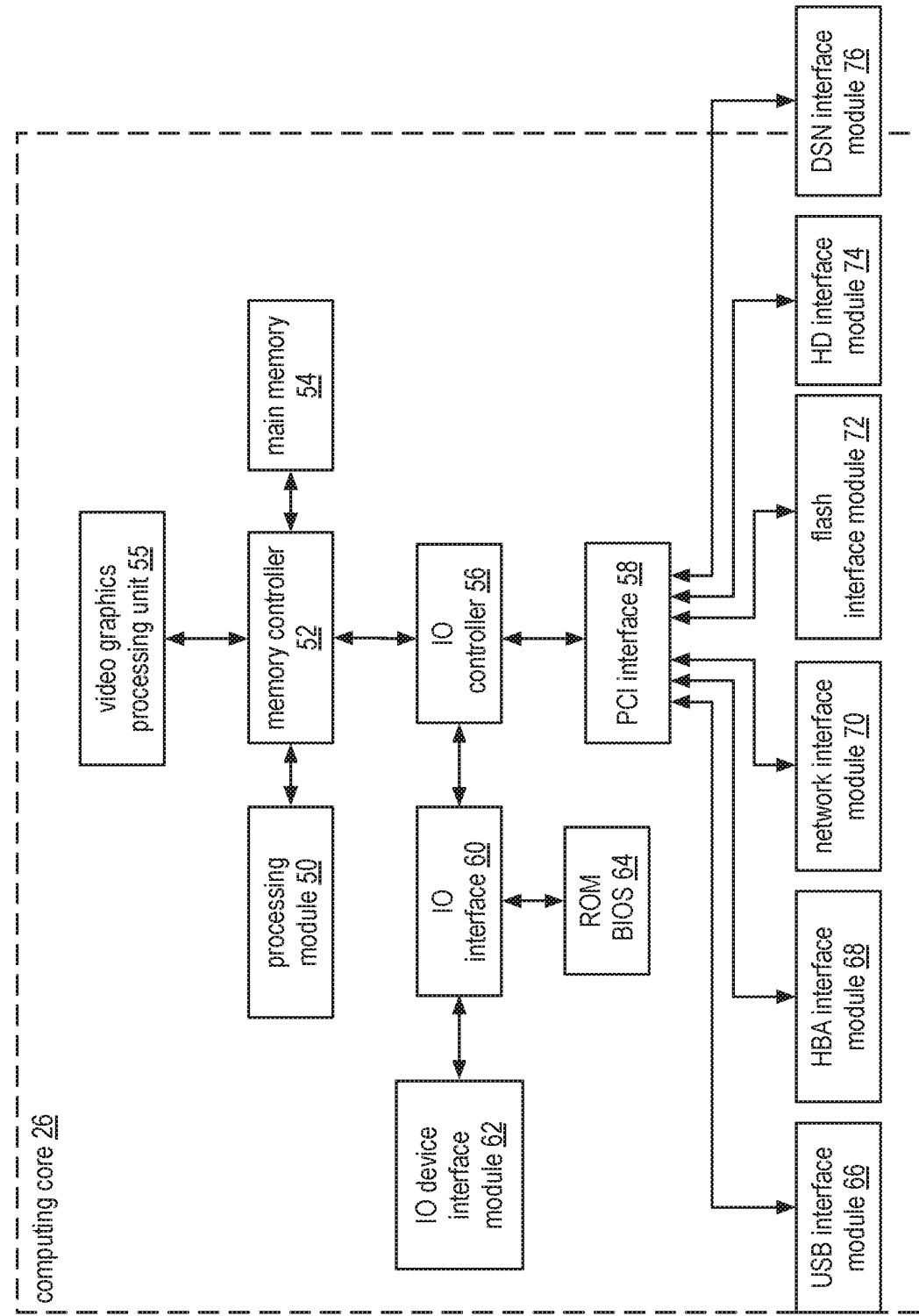
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity check-sum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
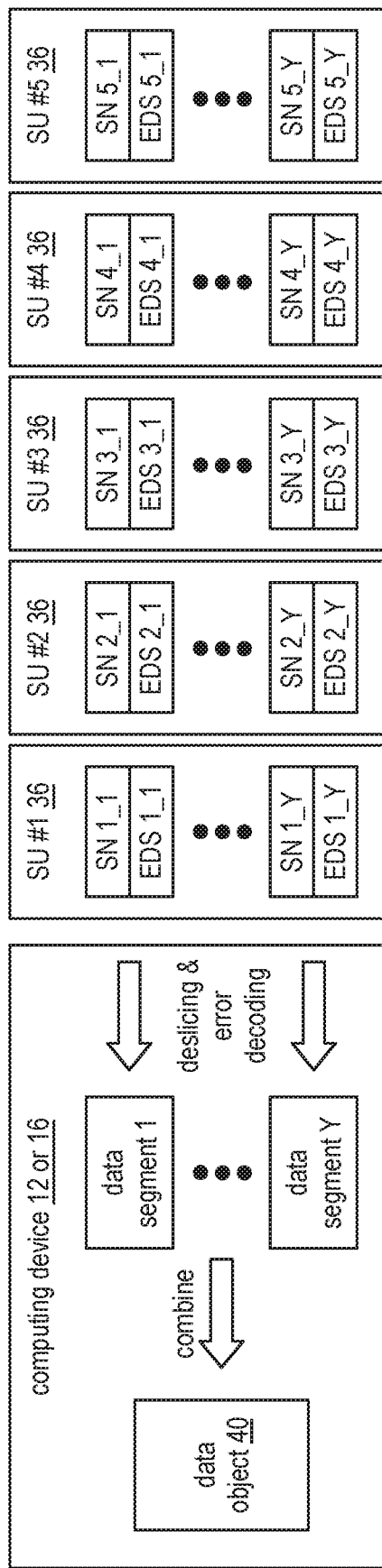
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
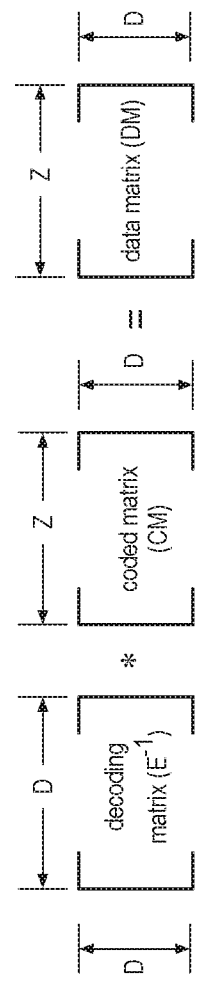
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
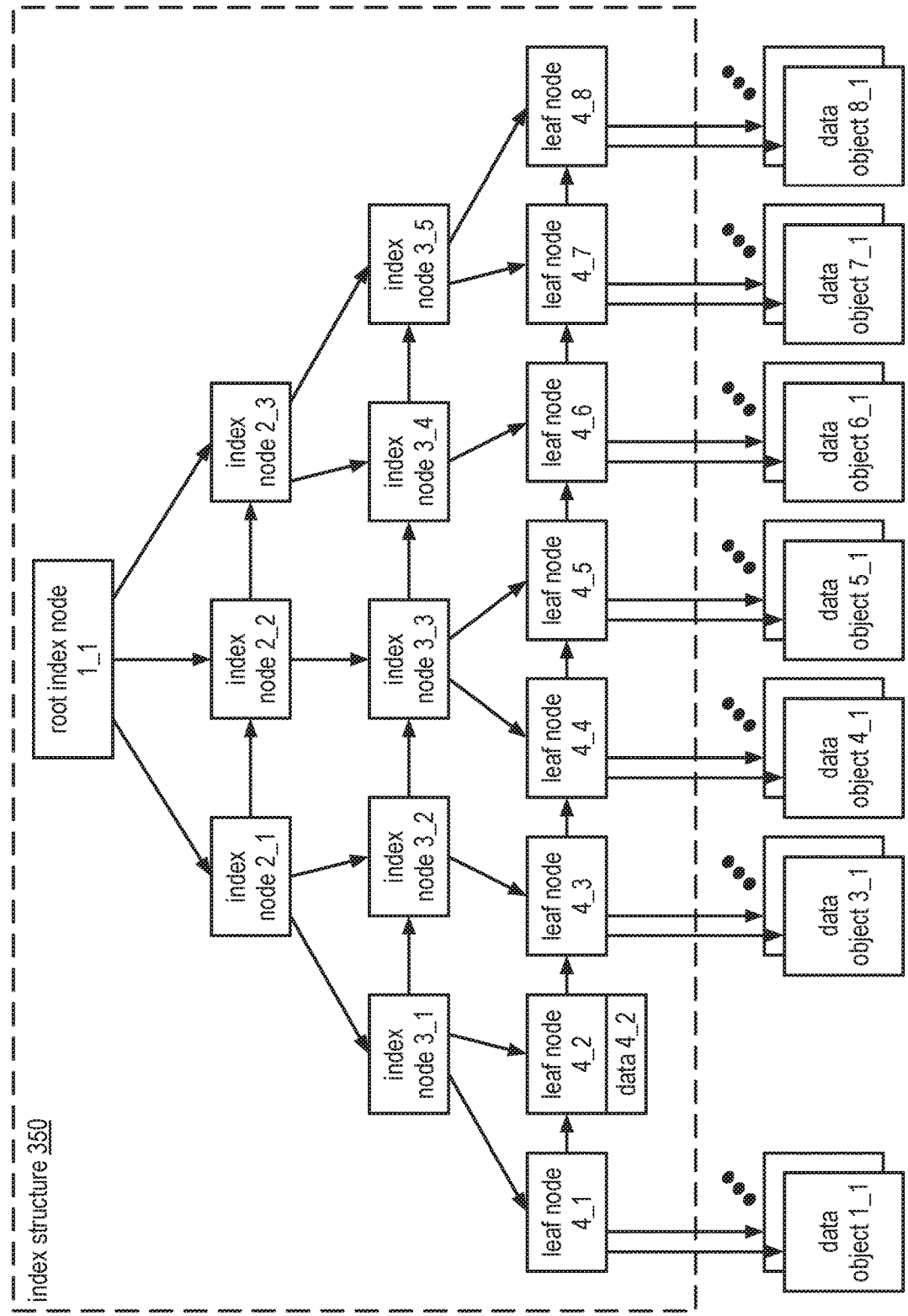
FIG. 9 is a schematic block diagram of an embodiment of a hierarchical index structure in accordance with the present invention.

FIG. 9 is a diagram illustrating an example of a distributed index structure 350 of one or more indexes utilized to access a data object of one or more data objects 1_1 through 1_w, 3_1 through 3_w, 4_1 through 4_w, etc., where at least some of the one or more data objects are stored in at least one of a distributed storage and task network (DSTN) and a dispersed storage network (DSN), and where a data object of the one or more data objects is dispersed storage error encoded to produce a plurality sets of encoded data slices, and where the plurality of sets of encoded data slices are stored in the DSN (e.g., and/or DSTN) utilizing a common source name (e.g., DSN address). The source name provides a DSTN and/or DSN address including one or more of vault identifier (ID) (e.g., such a vault ID associates a portion of storage resources of the DSN with one or more DSN user devices), a vault generation indicator (e.g., identify a vault generation of one or more of generations), and an object number that corresponds to the data object (e.g., a random number assigned to the data object when the data object is stored in the DSN).

The distributed index structure 350 includes at least two nodes represented in the index structure as nodes associated with two or more node levels. One or more nodes of the at least two nodes of the distributed index structure 350 may be dispersed storage error encoded to produce one or more sets of encoded index slices. The one or more sets of encoded index slices may be stored in at least one of a local memory, a DSN memory, and a distributed storage and task network (DSTN) module. For example, each node of a 100 node distributed index structure are individually dispersed storage error encoded to produce at least 100 sets of encoded index slices for storage in the DSTN module. As another example, the 100 node index structure is aggregated into one index file and the index file is dispersed storage error encoded to produce a set of encoded index slices for storage in the DSTN module.

Each node of the at least two nodes includes at least one of an index node and a leaf node. One index node of the at least two nodes includes a root index node. Alternatively, the distributed index structure 350 includes just one node, wherein the one node is a leaf node and where the leaf node is a root node. The distributed index structure 350 may include any number of index nodes, any number of leaf nodes, and any number of node levels. Each level of the any number of node levels includes nodes of a common node type. For example, all nodes of node level 4 are leaf nodes and all nodes of node level 3 are index nodes. As another example, as illustrated, the distributed index structure 350 includes eight index nodes and eight leaf nodes, where the eight index nodes are organized in three node levels, where a first node level includes a root index node 1_1, a second node level includes index nodes 2_1, 2_2, and 2_3, and a third node level includes index nodes 3_1, 3_2, 3_3, 3_4, and 3_5, and where the eight leaf nodes are organized in a last (e.g., fourth) node level, where the last node level includes leaf nodes 4_1, 4_2, 4_3, 4_4, 4_5, 4_6, 4_7, and 4_8.

Each data object of the one more data objects is associated with at least one index key per distributed index structure of the one or more distributed indexes, where the index key includes a searchable element of the distributed index and may be utilized to locate the data object in accordance with key type traits. An index key type of an index key includes a category of the index key (e.g. string integer, etc.). An index key type exhibits traits. Each index key is associated with one or more key type traits (e.g., for an associated index structure), where a key type traits includes one or more of a type indicator, a trait indicator, a comparing function (e.g., defining how an associate index key of this type should be compared, such as sorting and/or manipulation, to other such index keys), a serialization function (e.g., encoding function for storage), a de-serialization function (e.g., decoding function for retrieval), and an absolute minimum value of the index key.

Each leaf node of the at least two nodes may be associated with one or more data objects. The association includes at least one of, for each data object of the one more data objects, storing an index key associated with the data object in the leaf node, storing a source name associated with the data object in the leaf node, and storing the data object in the leaf node. For example, leaf node 4_2 includes a data object 4_2 and an index key associated with data object 4_2. As another example, leaf node 4_3 includes source names associated with data object 3_1 through 3_w and index keys associated with data object 3_1 through 3_w. Each leaf node is associated with a minimum index key, where the minimum index key is a minimum value of one or more index keys associated with the one or more data objects in accordance with the key type traits (e.g., sorted utilizing a comparing function of the key type traits to identify the minimum value).

Each leaf node is a child in a parent-child relationship with one index node, where the one index node is a parent in the parent-child relationship. Each child node has one parent node and each parent node has one or more child nodes. The one index node (e.g., parent node) stores a minimum index key associated with the leaf node (e.g., child node). As such, a parent node stores a minimum index key for each child node of the one or more child nodes. Two index nodes may form a parent-child relationship. In such a parent-child relationship, a parent-child node pair is represented in the index structure with a parent node of the parent-child relationship associated with a parent node level that is one level above in the index structure than a child node level associated with a child node of the parent-child relationship.

A leaf node is a sibling node of another leaf node when a minimum index key associated with the leaf node is ordered greater than a last minimum index key associated with the other leaf node, where the last minimum index key associated with the leaf node is sorted above any other last minimum index keys associated with any other lower order leaf nodes and where the minimum index key associated with the leaf node is ordered less than any other minimum index keys associated with any other higher order leaf nodes. A sibling node of a node is represented in the index structure on a common level with the node and one node position to the right. A last node on the far right of a node level has a no sibling (e.g., null sibling). All other nodes, if any, other than a last far right node, of a common node level have a sibling node. For example, leaf node 4_2 is a sibling node to leaf node 4_1, leaf node 4_3 is a sibling node to leaf node 4_2, etc., leaf node 4_8 is a sibling node to leaf node 4_7 and leaf node 4_8 has no sibling node.

Each index node of the at least two nodes may be associated with one or more child nodes. Such a child node includes at least one of another index node or a leaf node. The association includes, for each child node of the one more child nodes, storing a minimum index key associated with the child node in the index node and storing a source name associated with the child node in the index node. Each child node is associated with a minimum index key, where the minimum index key is a minimum value of one or more index keys associated with the child node (e.g., the minimum index key is a minimum value of one or more index keys associated with one or more children nodes of the child node or one or more data objects of the child node in accordance with the key type traits, sorted utilizing a comparing function of the key type traits to identify the minimum value when the child node is a leaf node). For example, index node 3_2 includes a minimum index key (e.g., of data object 3_1) and source name associated with leaf node 4_3. As another example, index node 3_3 includes a minimum index key and source name associated with leaf node 4_4 and another minimum index key and another source name associated with leaf node 4_5. As yet another example, index node 2_3 includes a minimum index key and source name associated with index node 3_4 and minimum index key and another source name associated with index node 3_5.

An index node is a sibling node of another index node when a minimum index key associated with the index node is ordered greater than a last minimum index key associated with the other index node, where the last minimum index key associated with the index node is sorted above any other last minimum index keys associated with any other lower order index nodes and where the minimum index key associated with the index node is ordered less than any other minimum index keys associated with any other higher order index nodes. For example, index node 3_2 is a sibling node to index node 3_1, index node 3_3 is a sibling node to index node 3_2, etc., index node 3_6 is a sibling node to index node 3_5 and index node 3_6 has no sibling node.

Figure 10:
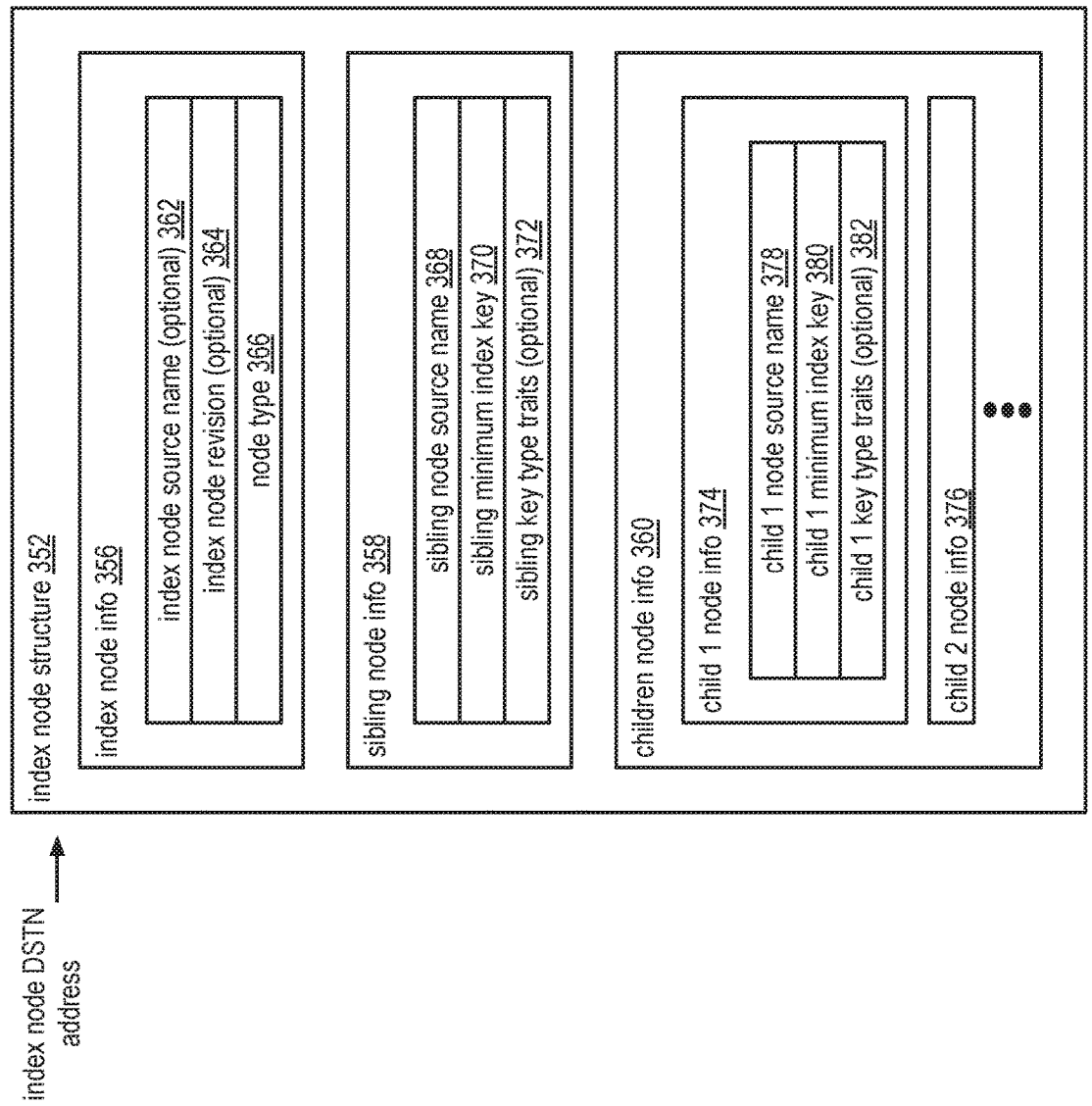
FIG. 10 is a schematic block diagram of an example of an index node in accordance with the present invention.

FIG. 10 is a diagram illustrating an example of an index node structure 352 for an index node that includes index node information 356, sibling node information 358, and children node information 360. Alternatively, there is no sibling node information 358 when the index node has no sibling node. The index node information 356 includes one or more of an index node source name field 362, an index node revision field 364, and a node type field 366. Inclusion and/or use of the index node source name field 362 and the index node revision field 364 is optional.

The sibling node information 358 includes a sibling node source name field 368, a sibling minimum index key field 370, and a sibling key type traits field 372. Inclusion and/or use of the sibling key type traits field 372 is optional. The children node information 360 includes one or more child node information sections 374, 376, etc. corresponding to each child node of the index node. Each child node information section of the one or more child node information sections includes a corresponding child node source name field 378, a corresponding child minimum index key field 380, and a corresponding child key type traits field 382. For example, the corresponding child node source name field 378 of a child 1 node information section 374 includes a child 1 node source name entry. Inclusion and/or use of the corresponding child key type traits field 382 is optional.

The index node source name field 362 may include an index node dispersed storage network (DSN) address 354 entry (e.g., source name) corresponding to a storage location for the index node. The index node revision field 364 may include an index node revision entry corresponding to a revision number of information contained in the index node. Use of the index node revision field 364 enables generating two or more similar indexes while saving each revision of the two or more similar indexes. The node type field 366 includes a node type entry, where the node type entry indicates whether the node is a leaf node or not a leaf node. The node type indicates that the node is not a leaf node when the node is the index node.

The sibling node source name field 368 includes a sibling node source name entry (e.g., sibling node DSN address) corresponding to where a sibling node is stored in a DSN memory and/or a distributed storage and task network (DSTN) module when the index node has the sibling node as a sibling. The sibling node is another index node when the index node has the sibling. The sibling node source name field 368 may include a null entry when the index node does not have a sibling. The sibling minimum index key field 370 includes a sibling of minimum index key corresponding to the sibling node when the index node has the sibling node as the sibling. The sibling key type traits field 372 may include sibling key type traits corresponding to the sibling node when the index node has the sibling node as the sibling and when the sibling key type traits field is utilized. Alternatively, index structure metadata may include key type traits utilized globally for each node of the index structure.

The index structure metadata may include one or more of key type traits to be utilized for all nodes of a corresponding index, key type traits to be utilized for all index nodes of the corresponding index, key type traits to be utilized for all leaf nodes of the corresponding index, a source name of a root node of the index structure, a maximum number of index structure levels, a minimum number of the next level structures, a maximum number of elements per index structure level, a minimum number of elements per index structure level, and index revision number, and an index name. The index structure metadata may be utilized for one or more of accessing the index, generating the index, updating the index, saving the index, deleting portions of the index, adding a portion to the index, cloning a portion of the index, and searching through the index. The index structure metadata may be stored in one or more of a local memory, one or more nodes of the index structure, and as encoded metadata slices in at least one of the DSTN module and the DSN memory.

The child node source name field 378 includes a child node source name entry (e.g., child node DSN address) corresponding to a storage location for the child node. For example, a child 1 node source name field 378 of a child 1 node information section 374 includes a child 1 node source name. The child minimum index key field 380 includes a child minimum index key corresponding to the child node. For example, a child 1 minimum index key field 380 of the child 1 node information section 374 includes a child 1 minimum index key. The child key type traits field 382 may include child key type traits corresponding to the child node when the index node has the child node as the child and when the child key type traits field is utilized. Alternatively, the index structure metadata may include key type traits utilized globally for each node of the index structure.

Figure 11:
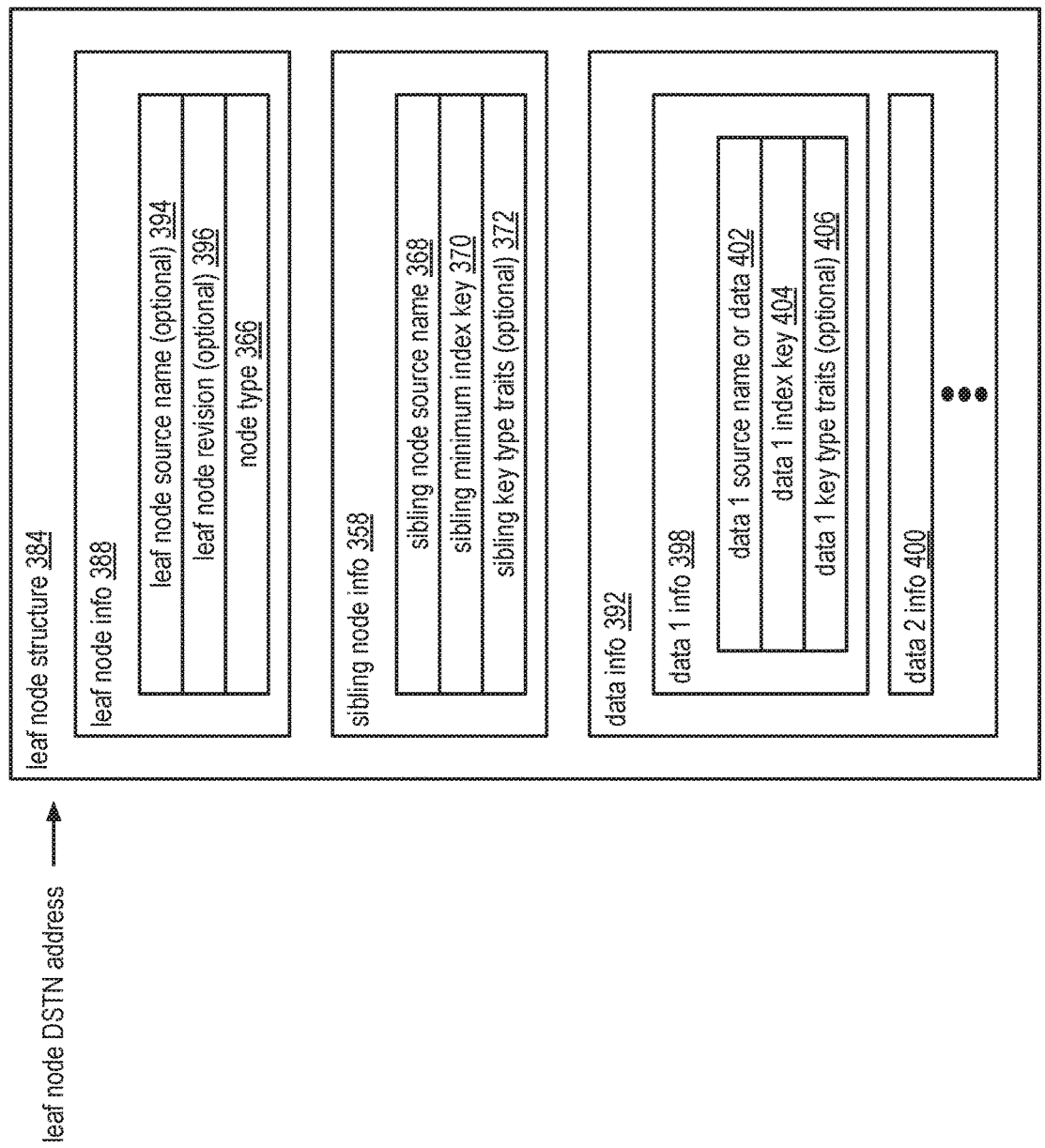
FIG. 11 is a schematic block diagram of an example of a leaf node in accordance with the present invention.

FIG. 11 is a diagram illustrating an example of a leaf node structure 384 that includes leaf node information 388, sibling node information 358, and data information 392. Alternatively, there is no sibling node information 358 when the leaf node has no sibling node. The leaf node information 388 includes one or more of a leaf node source name field 394, a leaf node revision field 396, and a node type field 366. Inclusion and/or use of the leaf node source name field 394 and the leaf node revision field 396 is optional. The sibling node information 358 includes a sibling node source name field 368, a sibling minimum index key field 370, and a sibling key type traits field 372. Inclusion and/or use of the sibling key type traits field 372 is optional. The data information 392 includes one or more data information sections 398, 400, etc. corresponding to each data object associated with the leaf node. Alternatively, the data information 392 includes null information when no data object is presently associated with the leaf node. Each data information section of the one or more data information sections includes a corresponding data (e.g., data object) source name or data field 402, a corresponding data index key field 404, and a corresponding data key type traits field 406. For example, the corresponding data source name field 402 of a data 1 node information section 398 includes a data 1 source name entry. Inclusion and/or use of the corresponding data key type traits field 406 is optional.

The leaf node source name field 394 may include a leaf node source name entry (e.g., leaf node distributed storage and task network (DSTN) address and/or a dispersed storage network (DSN) address) corresponding to a storage location of the leaf node. The leaf node revision field 396 may include a leaf node revision entry corresponding to a revision number of information contained in the leaf node. Use of the leaf node revision enables generating two or more similar indexes while saving each revision of the two or more similar indexes. The node type field 366 includes a node type, where the node type indicates whether the node is a leaf node or not a leaf node. The node type indicates that the node is a leaf node when the node is the leaf node.

The sibling node source name field 368 includes a sibling node source name entry (e.g., sibling node DSN address) corresponding to a storage location for a sibling when the leaf node has the sibling node as a sibling. The sibling node is another leaf node when the leaf node has the sibling. The sibling node source name field 368 may include a null entry when the leaf node does not have a sibling. The sibling minimum index key field 370 includes a minimum index key associated with the sibling node when the leaf node has the sibling node as the sibling. The sibling key type traits field 372 may include sibling key type traits corresponding to the sibling node when the leaf node has the sibling node as the sibling and when the sibling key type traits field 372 is utilized. Alternatively, index structure metadata may include key type traits utilized globally for each leaf node of the index structure.

The data source name or data field 402 includes at least one of a data source name entry (e.g., a DSN address) corresponding to a storage location of data and the data (e.g., a data object, one or more encoded data slices of data). For example, a data 1 source name or data field 402 of a data 1 information section 398 includes a DSN address source name of a first data object. As another example, the data 1 source name or data field 402 of the data 1 information section includes the data 1 data object. The data index key field 404 includes a data index key corresponding to the data. For example, a data 1 index key field order for of the data 1 information section 398 includes a data 1 index key. The data key type traits field 406 may include data key type traits corresponding to the data when the data key type traits field 406 is utilized. Alternatively, the index structure metadata may include key type traits utilized globally for each data object associated with the index structure.

Figure 12:
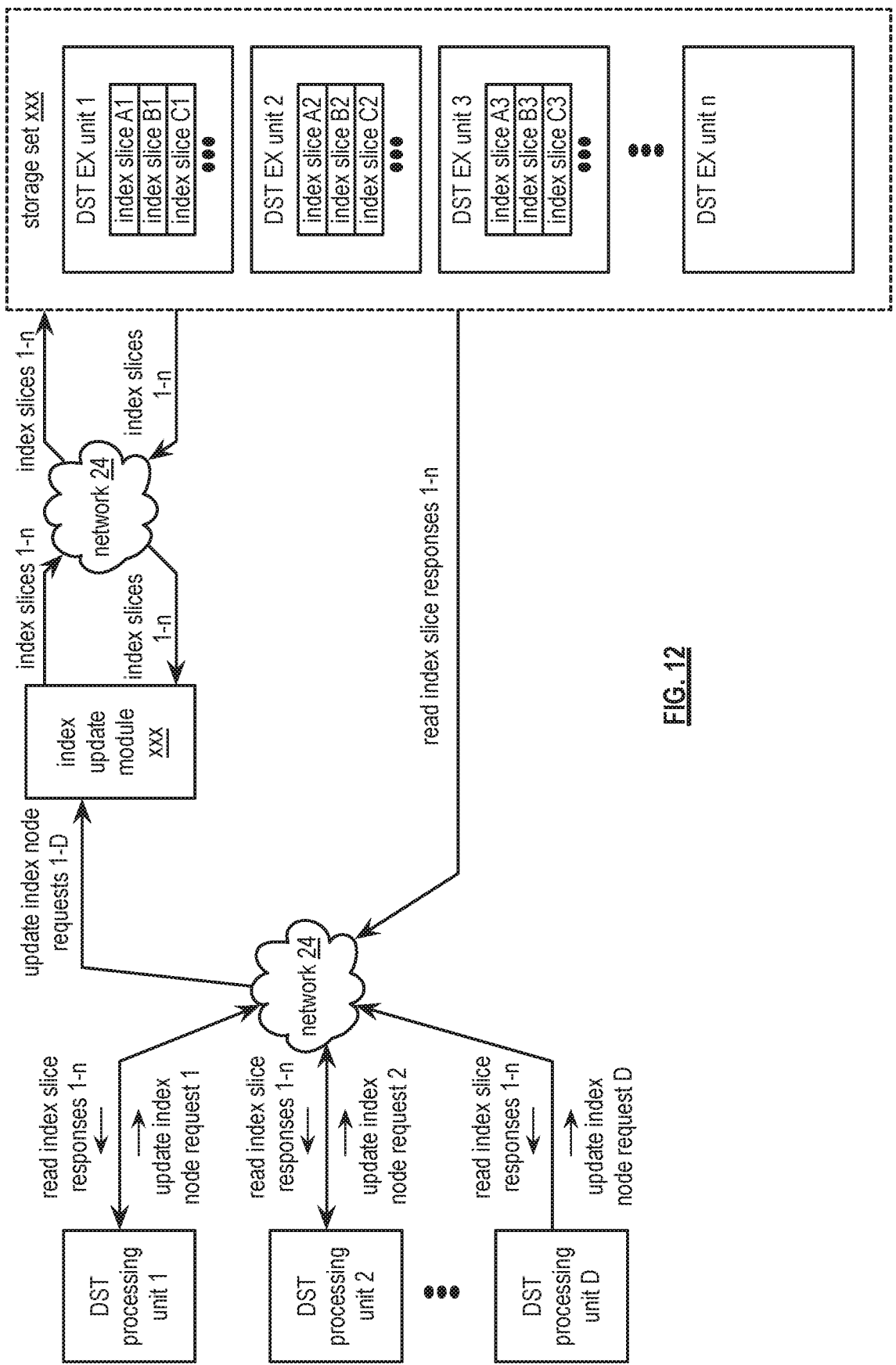
FIG. 12 is a schematic block diagram of an embodiment of updating a hierarchical index structure of a DSN in accordance with the present invention.

FIG. 12 is a schematic block diagram of another embodiment of a dispersed storage network (DSN) that includes a plurality of distributed storage and task (DST) processing units 1-D, the network 24 of FIG. 1, one or more delegate devices 75, and a storage set 85. The storage set includes a set of DST execution (EX) units 1-n. Each DST execution unit may be implemented utilizing the DST execution unit 36 of FIG. 1. Note that each DST execution unit may be referred to as a storage unit and the storage set may be referred to as a set of storage units. Further note that the delegate device 75 may be implemented as a separate computing device within the DSN or as part of another device of the DSN (e.g., computing devices 12-16, storage units 36, managing unit 18, and/or integrity processing unit 20).

The DSN functions to update an index node of a dispersed hierarchical index stored in the storage set as a plurality of index nodes. The dispersed article index includes a top-level root index node and one or more other levels of children index nodes, where a level above a children index node level includes parent index nodes, where a parent index node includes pointers to each child index node and to another common level parent index node, where each index node includes one or more entries (e.g., values stored in the dispersed article index, i.e., a DSN address associated with stored data), where each entry is associated with an index key value within a range of index key values associated with the index node.

In an example of operation of the updating of the index node, the plurality of DST processing units recovers the index node from the storage set, where the index node is dispersed storage error encoded to produce a set of index slices that are stored in the storage set. For example, the DST processing unit 2 issues, via the network 24, a set of read index slice requests 1-n to the storage set receives read index slice responses 1-n, dispersed storage error decodes the received index slices to reproduce the index node, and extracts at least one entry of a plurality of entries of the reproduced index node.

Having recovered the index node, the plurality of DST processing units update one or more entries of the reproduced index node. For example, DST processing unit 2 performs an operation requiring updating of the entry and DST processing unit 1 performs another operation requiring further updating of another entry of the plurality of entries of the index node. Having updated the one or more entries of the reproduced index node, the plurality of DST processing units issue update index node requests to the index update module, where an index node request includes an updated entry. For instance, the DST processing units 1-D issues, via the network 24, updated next node requests 1-D to the index update module.

The index update module determines to update the index node in the storage set based on the received update index node requests. The determining includes one or more of detecting that an update timeframe has elapsed, detecting receipt of greater than a threshold number of update index node requests for the index node, and receiving a priority request to update the index node. Having determined to update the index node, the index update module recovers the next node from the storage set. For example, the index update module issues index slice requests 1-n to the storage set, receives index slices A1-An, and disperse storage error decodes the received index slices to reproduce the index node.

Having recovered the index node, the index update module updates the recovered index node based on the received update the index node requests. For example, the index update module modifies one or more entries of the recovered index node utilizing entries extracted from the received update index node requests (e.g., prioritizing most recently received requests when two or more requests pertain to a common entry, randomly assigning priority for conflicting entry requests, aligning priority based on which particular DST processing unit requested an update for an entry conflicting with another DST processing unit, etc.).

Having updated the recovered index node to produce the updated index node, the index update module facilitates storage of the updated index node in the storage set. For example, the update index node dispersed storage error encodes the updated index node to produce an updated set of index slices 1-n and sends, via the network 24, the updated set of index slices 1-n to the DST execution units 1-n for storage.

FIG. 13 is a flowchart illustrating an example of updating an index node of a dispersed hierarchical index. The method includes step 90 where a plurality of processing units recovers and index node of a dispersed hierarchical index from a set of storage units (e.g., a storage set). For example, each processing unit issues read index slice requests to the set of storage units, receives read index slice responses, dispersed storage error decodes received index slices to reproduce the index node, and extracts at least one entry of a plurality of entries from the reproduced index node.

The method continues at step 92 where at least some of the plurality of processing units update one or more entries of the recovered index node. For example, a first processing unit performs operation requiring modification of entry to produce an updated entry associated with the first processing unit. The method continues at step 94 where the at least some of the plurality of processing unit issues update index node requests to an index update module. For example, the first processing unit generates an updated index node request to include the updated entry associated with the first processing unit and sends the updated index node request to the index update module.

The method continues at step 96 where the index update module determines to update the index node in the storage set based on the received update index node requests. The determining includes one or more of detecting that an update timeframe has elapsed, detecting receiving of greater than a threshold number of update the next node requests, and receiving a request to update the index node with priority.

The method continues at step 98 where the index update module recovers a copy of the index node from the storage set. For example, the index update module issues index slice requests to the set of storage units, receives index slice responses, and dispersed storage error decodes received index slices A1-An to produce the copy of the index node. The method continues at step 100 where the index update module updates the copy of the index node to produce an updated index node based on the update index node request. For example, the index update module modifies one or more entries of the recovered index node utilizing entries extracted from the received update index node requests.

The method continues at step 102 where the index update module facilitates storage of the updated index node in the storage set. For example, the index update module dispersed storage error encodes the updated index node to produce an updated set of index slices A1-An and sends the updated set of index slices A1-An to the set of storage units for storage.

FIG. 14 is a logic diagram of another example of a method of updating a hierarchical index structure of a DSN that begins at step 110 where a computing device of the DSN determines to change a node (e.g., a root, index, or leaf) of a plurality of nodes of a hierarchical index structure (e.g., of FIG. 9). The method continues at step 112 where the computing device determines whether one or more other computing devices are attempting to change the node. For example, the computing device determines, by default, that the one or more other computing devices are attempting to change the node. For instance, the computing device assumes that there is at least one other device attempting to modify the node.

As another example, the computing device sends a retrieval request to one or more storage units of the DSN regarding retrieving the node for updating. In response, the computing device receives, from the storage unit(s), an indication that another computing device(s) have issued similar retrieval requests. As yet another example, the computing device queries other computing devices regarding the node to identify the one or more other computing devices.

If not, the method continues at step 114, where the computing device updates the node. For example, the node is dispersed storage error encoded to produce the set of encoded node slices, wherein the set of encoded data slices is stored in a set of storage units. Accordingly, the computing device retrieves a decode threshold number of encoded node slices from the storage units. The computing device recovers the node from the decode threshold number of encoded node slices and modifies it to the include the desired change. The computing device then dispersed storage error encoding the modified node to produce a set of updated encoded node slice, which is sent to the storage units for storing.

When one or more other computing devices are attempting to change the node, the method continues at step 116 where the computing device and/or one or more the other computing devices determines to use a delegate device to process multiple change requests to the node. For example, the computing device and/or the other computing device(s) determine to use the delegate device by default (e.g., whenever there are two or more computing devices attempting to change the same node at substantially the same time, they will use a delegate). As another example, the computing device and/or the other computing device(s) coordinate to determine to use the delegate device (e.g., via a communication exchange, agree to use the delegate device). If not, the computing devices individually process their respective change to the node at step 114.

When the computing device(s) determine to use the delegate device, the computing device sends a message to the delegate device requesting the delegate device to process the change to the node on behalf of the computing device. Note that the computing device and other computing devices identify the delegate device in a variety of ways. For example, the computing devices select the delegate device from a group that includes the computing device and the one or more other computing devices. As another example, the computing devices select the delegate device from a group that includes the first group, other computing devices of the DSN, and storage units of the DSN. As yet another example, the computing devices identify the delegate device based on a predetermined configuration of the DSN.

The method continues at step 118 where the delegate device coordinates the requested changes to the node of the computing device and the other computing device(s). For example, the delegate device aggregates the requested changes to produce an aggregate change. For instance, the changes may be aggregated or batched when they relate to different parts of the node (e.g., one is changing one child information section and another is changing a different child information section). Note that changing includes adding, deleting, and/or editing. As another example, the delegate device orders the requested changes to produce a sequential order of requested changes. For instance, if the changes are regarding the same section of the node, then the change requests are sequentially ordered. As yet another example, the delegate device analyzes the requested changes to identify conflicting changes and, when the conflicting change are identified, resolving the conflict to produce a resolved requested change. For instance, delete one of the changes when it conflicts with another change request (e.g., a request to delete a child information section and a request for editing the child information section, the deleting request would be ignored).

The method continues at step 120 where the delegate device updates the node in accordance with the coordinating of the requested changes. For example, the delegate device retrieves a decode threshold number of encoded node slices from storage units. The delegate device recovers the node from the decode threshold number of encoded node slices. The delegate device then modifies the node to include the coordinated requested changes to produce a modified node. For example, the delegate device adds a child information section in response to one request; edits another child information section in response to another request, and deletes yet another child information section in response to yet another request. The delegate device then dispersed storage error encoding the modified node to produce a set of updated encoded node slice and sends it to the storage units for storage therein.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   determining, by a computing device of a dispersed storage network (DSN), to change a node of a plurality of nodes of an index structure, wherein the index structure is used to identify particular data stored in the DSN and wherein the plurality of nodes includes a root index node, a plurality of index nodes, and a plurality of leaf index nodes arranged in a related hierarchical manner;
   determining, by the computing device, whether one or more other computing devices are attempting to change the node;
   when one or more other computing devices are attempting to change the node, determining, by at least one of the computing device and the one or more other computing devices, to use a delegate device to process multiple change requests to the node;
   when determined to use the delegate device, sending, by the computing device, a message to the delegate device requesting the delegate device to process the change to the node on behalf of the computing device;
   coordinating, by the delegate device, requested changes to the node by the computing device and the one or more other computing devices; and
   updating, by the delegate device, the node in accordance with the coordinating of the requested changes.

2. The method of claim 1, wherein the determining whether one or more other computing devices are attempting to change the node comprises one or more of:
   determining, by default, that the one or more other computing devices are attempting to change the node;
   sending a retrieval request to one or more storage units of the DSN regarding retrieving the node for updating and receiving, from the one or more storage units, an indication that the one or more other computing device have issued similar retrieval requests; and
   querying other computing devices regarding the node to identify the one or more other computing devices.

3. The method of claim 1, wherein the determining to use the delegate device comprises one or more of:
   determining, by default, to use the delegate device; and
   coordinating, by the computing device, with the one or more other computing devices to use the delegate device.

4. The method of claim 1 further comprises one of:
   selecting the delegate device from a first group that includes the computing device and the one or more other computing devices;
   selecting the delegate device from a second group that includes the first group, other computing devices of the DSN, and storage units of the DSN; and
   identifying the delegate device based on a predetermined configuration of the DSN.

5. The method of claim 1, wherein the coordinating the requested changes comprises one or more of:
   aggregating the requested changes to produce an aggregate change;
   ordering the requested changes to produce a sequential order of requested changes; and
   analyzing the requested changes to identify conflicting changes and, when the conflicting change are identified, resolving the conflict to produce a resolved requested change.

6. The method of claim 1, wherein the updating the node comprises:
   retrieving a decode threshold number of encoded node slices from storage units of the DSN, wherein the node is dispersed storage error encoded to produce a set of encoded node slices, wherein the set of encoded node slices is stored in a set of storage units, and wherein the decode threshold number of encoded node slices represents a minimum number of encoded node slices of the set of encoded node slices needed to recover the node;

recovering the node from the decode threshold number of encoded node slices;

modifying the node to include a coordinated requested change to produce a modified node;

dispersed storage error encoding the modified node to produce a set of updated encoded node slice; and sending the set of updated encoded node slice to the set of storage units for storage therein.

7. The method of claim 1, wherein an index node of the plurality of plurality of index nodes comprises one or more of:

a node information section that includes one or more of: a source name, a node revision level, and an index node indicator;

a sibling node information section that includes one or more of: a sibling source name, a sibling minimum key index, and a sibling key type trait; and one or more child node information sections, wherein a child node information section of the one or more child node information sections includes one or more of: a child source name, a child minimum key index, and a child key type trait.

8. The method of claim 1, wherein a leaf node of the plurality of leaf index nodes comprises one or more of:

a node information section that includes one or more of: a source name, a node revision level, and a leaf node indicator;

a sibling node information section that includes one or more of: a sibling source name, a sibling minimum key index, and a sibling key type trait; and one or more data object information sections, wherein a data object information section of the one or more data object information sections includes one or more of: a data object source name, a plurality of sets of encoded data slices, a data object index key, and a data object key type trait.

9. A computer readable memory comprises:

a first memory element that stores operational instructions that, when executed by a computing device of a dispersed storage network (DSN), causes the computing device to:

determine to change a node of a plurality of nodes of an index structure, wherein the index structure is used to identify particular data stored in the DSN and wherein the plurality of nodes includes a root index node, a plurality of plurality of index nodes, and a plurality of leaf index nodes arranged in a related hierarchical manner; and determine whether one or more other computing devices are attempting to change the node;

a second memory element that stores operational instructions that, when executed by at least one of the computing device and the one or more other computing devices, causes the at least one of the computing device and the one or more other computing devices to:

when one or more other computing devices are attempting to change the node, determine to use a delegate device to process multiple change requests to the node;

a third memory element that stores operational instructions that, when executed by the computing device, causes the computing device to:

when determined to use the delegate device, send a message to the delegate device requesting the delegate device to process the change to the node on behalf of the computing device;

a fourth memory element that stores operational instructions that, when executed by the delegate device, causes the delegate device to:

coordinate requested changes to the node by the computing device and the one or more other computing devices; and update the node in accordance with the coordinating of the requested changes.

10. The computer readable memory of claim 9, wherein the first memory element further stores operational instructions that, when executed by the computing device, causes the computing device to determining whether one or more other computing devices are attempting to change the node comprises one or more of:

determining, by default, that the one or more other computing devices are attempting to change the node;

sending a retrieval request to one or more storage units of the DSN regarding retrieving the node for updating and receiving, from the one or more storage units, an indication that the one or more other computing device have issued similar retrieval requests; and querying other computing devices regarding the node to identify the one or more other computing devices.

11. The computer readable memory of claim 9, wherein the second memory element further stores operational instructions that, when executed by at least one of the computing device and the one or more other computing devices, causes the at least one of the computing device and the one or more other computing devices to determine to use the delegate device comprises one or more of:

determining, by default, to use the delegate device; and coordinating, by the computing device, with the one or more other computing devices to use the delegate device.

12. The computer readable memory of claim 9, wherein the second memory element further stores operational instructions that, when executed by at least one of the computing device and the one or more other computing devices, causes the at least one of the computing device and the one or more other computing devices to perform one of:

selecting the delegate device from a first group that includes the computing device and the one or more other computing devices;

selecting the delegate device from a second group that includes the first group, other computing devices of the DSN, and storage units of the DSN; and identifying the delegate device based on a predetermined configuration of the DSN.

13. The computer readable memory of claim 9, wherein the fourth memory element further stores operational instructions that, when executed by the delegate device, causes the delegate device to coordinate the requested changes by one or more of:

aggregating the requested changes to produce an aggregate change;

ordering the requested changes to produce a sequential order of requested changes; and analyzing the requested changes to identify conflicting changes and, when the conflicting change are identified, resolving the conflict to produce a resolved requested change.

14. The computer readable memory of claim 9, wherein the fourth memory element further stores operational instructions that, when executed by the delegate device, causes the delegate device to update the node by:

retrieving a decode threshold number of encoded node slices from storage units of the DSN, wherein the node is dispersed storage error encoded to produce a set of encoded node slices, wherein the set of encoded node slices is stored in a set of storage units, and wherein the decode threshold number of encoded node slices represents a minimum number of encoded node slices of the set of encoded node slices needed to recover the node;

recovering the node from the decode threshold number of encoded node slices;

modifying the node to include a coordinated requested change to produce a modified node;

dispersed storage error encoding the modified node to produce a set of updated encoded node slice; and sending the set of updated encoded node slice to the set of storage units for storage therein.

15. The computer readable memory of claim 9, wherein an index node of the plurality of plurality of index nodes comprises one or more of:

a node information section that includes one or more of: a source name, a node revision level, and an index node indicator;

a sibling node information section that includes one or more of: a sibling source name, a sibling minimum key index, and a sibling key type trait; and one or more child node information sections, wherein a child node information section of the one or more child node information sections includes one or more of: a child source name, a child minimum key index, and a child key type trait.

16. The computer readable memory of claim 9, wherein a leaf node of the plurality of leaf index nodes comprises one or more of:

a node information section that includes one or more of: a source name, a node revision level, and a leaf node indicator;

a sibling node information section that includes one or more of: a sibling source name, a sibling minimum key index, and a sibling key type trait; and one or more data object information sections, wherein a data object information section of the one or more data object information sections includes one or more of: a data object source name, a plurality of sets of encoded data slices, a data object index key, and a data object key type trait.

* * * * *